United States Patent
Chen (10) Patent No.: US 12,185,032 B2
(45) Date of Patent: Dec. 31, 2024

(54) METHOD AND PROJECTION SYSTEM FOR CALIBRATING PROJECTION AREA OF PROJECTOR

(71) Applicant: Coretronic Corporation, Hsin-Chu (TW)

(72) Inventor: Kun-Hong Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 88 days.

(21) Appl. No.: 18/312,573

(22) Filed: May 4, 2023

(65) Prior Publication Data

US 2023/0362339 A1    Nov. 9, 2023

(30) Foreign Application Priority Data

May 7, 2022    (CN) .......................... 202210492109.6

(51) Int. Cl.
*H04N 9/31* (2006.01)
*G06T 7/11* (2017.01)

(52) U.S. Cl.
CPC ............. *H04N 9/3185* (2013.01); *G06T 7/11* (2017.01); *G06T 2207/10004* (2013.01)

(58) Field of Classification Search
CPC ... H04N 9/3188; H04N 9/3185; G03B 21/147
See application file for complete search history.

(56) References Cited

U.S. PATENT DOCUMENTS

| | | | | |
|---|---|---|---|---|
| 2005/0213846 | A1* | 9/2005 | Matsuda | G03B 21/14 353/69 |
| 2016/0182873 | A1* | 6/2016 | Sumiyoshi | H04N 9/3194 348/747 |
| 2023/0124225 | A1* | 4/2023 | Sudo | G06T 3/06 348/744 |

FOREIGN PATENT DOCUMENTS

| | | |
|---|---|---|
| CN | 106954054 | 9/2019 |
| CN | 111935465 | 11/2020 |
| CN | 109151415 | 3/2021 |

* cited by examiner

*Primary Examiner* — John W Miller
*Assistant Examiner* — Humam M Satti
(74) *Attorney, Agent, or Firm* — JCIPRNET (57) ABSTRACT

A method and a projection system for calibrating a projection area of a projector are provided. The method includes the following. A calibration pattern is projected to form a projection area, and includes a first original mark group and a second original mark group. A captured image including the projection area is obtained. Whether the captured image includes a closed area formed by a complete line is determined. A first calibration operation is performed when the captured image does not include the closed area. A second calibration operation is performed when the projection area in the captured image includes the complete closed area. The projection area is calibrated according to a first mark group or a second mark group in the captured image during the first calibration operation. The projection area is calibrated according to the second mark group in the captured image during the second calibration operation.

13 Claims, 9 Drawing Sheets

FIG. 9

US 12,185,032 B2

METHOD AND PROJECTION SYSTEM FOR CALIBRATING PROJECTION AREA OF PROJECTOR

CROSS-REFERENCE TO RELATED APPLICATION

This application claims the priority benefit of Chinese application no. 202210492109.6, filed on May 7, 2022. The entirety of the above-mentioned patent application is hereby incorporated by reference herein and made a part of this specification.

BACKGROUND

Technical Field

The disclosure relates to a projection method and a projection system. In particular, the disclosure relates to a method and a projection system for calibrating a projection area of a projector.

Description of Related Art

Image keystone calibration of a projector may be generally achieved by three different methods, including calibration in a vertical direction on a projected image using an accelerometer, calibration on a projected image within a projection screen frame or within an area range with a frame shape using a camera, and calibration in vertical and horizontal directions on a projected image using a time of flight (ToF) sensor according to a relative angle of a projection plane. Each of the above has its own drawbacks. Firstly, in the calibration using the accelerometer, the calibration on the projected image can only be performed in the vertical direction. In addition, the calibration cannot be performed correctly when a 90-degree included angle is not presented between the projection plane and the projection screen or wall. Secondly, when the camera cannot identify the frame (e.g., the frame of the projection screen) or when a distance between the projector and the projection plane is not sufficient, the calibration cannot be completed since the projected image cannot include the complete frame. Thirdly, the calibration using the ToF sensor is not applicable to projection with a frame since the ToF sensor cannot know the existence of the frame and the actual coordinate position thereof. Therefore, none of the three calibration manners above satisfy all application scenarios of a projector.

For the calibration using the camera, when a throw ratio of the lens of the projection system belongs to a throw ratio of an ultra-short throw lens, the projector is required to perform projection at an elevation angle or in a bird's-eye view due to an excessively short distance between the lens and the projection plane. When the elevation angle of the projector is excessively large, it is not likely for the camera to capture the complete projection plane. Therefore, it may be required to dispose a fisheye lens or a wide-angle lens in the camera. However, calculation of most calibration algorithms is based on the rectangular coordinate system. Since images captured by the fisheye lens or the wide-angle lens may be distorted and deformed, the fisheye lens or the wide-angle lens is not applicable to most calibration algorithms.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a method and a projection system for calibrating a projection area of a projector, which are adapted to calibrate a projection area of a projector having an ultra-short throw lens.

According to an embodiment of the disclosure, a method for calibrating a projection area of a projector includes the following. A calibration pattern is projected by the projector to form the projection area. The calibration pattern includes a first original mark group and a second original mark group. The second original mark group surrounds the first original mark group, and the first original mark group surrounds a center point of the calibration pattern. A captured image including the projection area is obtained by an image capturing device. The captured image includes a first mark group corresponding to the first original mark group and a second mark group corresponding to the second original mark group. First image recognition is performed on the captured image by a processor to determine whether the captured image includes a closed area formed by a complete line, a first calibration operation is performed when the processor determines that the captured image does not include the closed area, and a second calibration operation is performed when the processor determines that the projection area in the captured image includes the complete closed area. The projection area is calibrated according to the first mark group or the second mark group in the captured image during the first calibration operation. The projection area is calibrated according to the second mark group in the captured image during the second calibration operation.

According to an embodiment of the disclosure, a projection system includes a projector, an image capturing device, and a processor. The processor is coupled to the image capturing device and the projector. The processor is configured to project a calibration pattern by the projector to form a projection area; obtain a captured image including the projection area by the image capturing device; perform first image recognition on the captured image to determine whether the captured image includes a closed area formed by a complete line, perform a first calibration operation when the captured image does not comprise the closed area, and perform a second calibration operation when the projection area in the captured image includes the complete closed area; calibrate the projection area according to a first mark group or a second mark group included in the captured image during the first calibration operation; and calibrate the projection area according to the second mark group included in the captured image during the second calibration operation. The calibration pattern includes a first original mark group and a second original mark group. The second original mark group surrounds the first original mark group, and the first original mark group surrounds a center point of the calibration pattern. The first mark group corresponds to the first original mark group and the second mark group corresponds to the second original mark group.

Based on the foregoing, in the projection system according to the embodiments of the disclosure, the calibration pattern including the first original mark group and the second original mark group surrounding the first original mark group may be projected by the projector, and the projection area of the projector may be calibrated by the captured image corresponding to the calibration pattern. Regardless of whether the projector application scenario includes a projection screen or wall having a complete frame, the projection system can calibrate the projection area of the projector having an ultra-short throw lens utilizing the appropriate original mark group.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
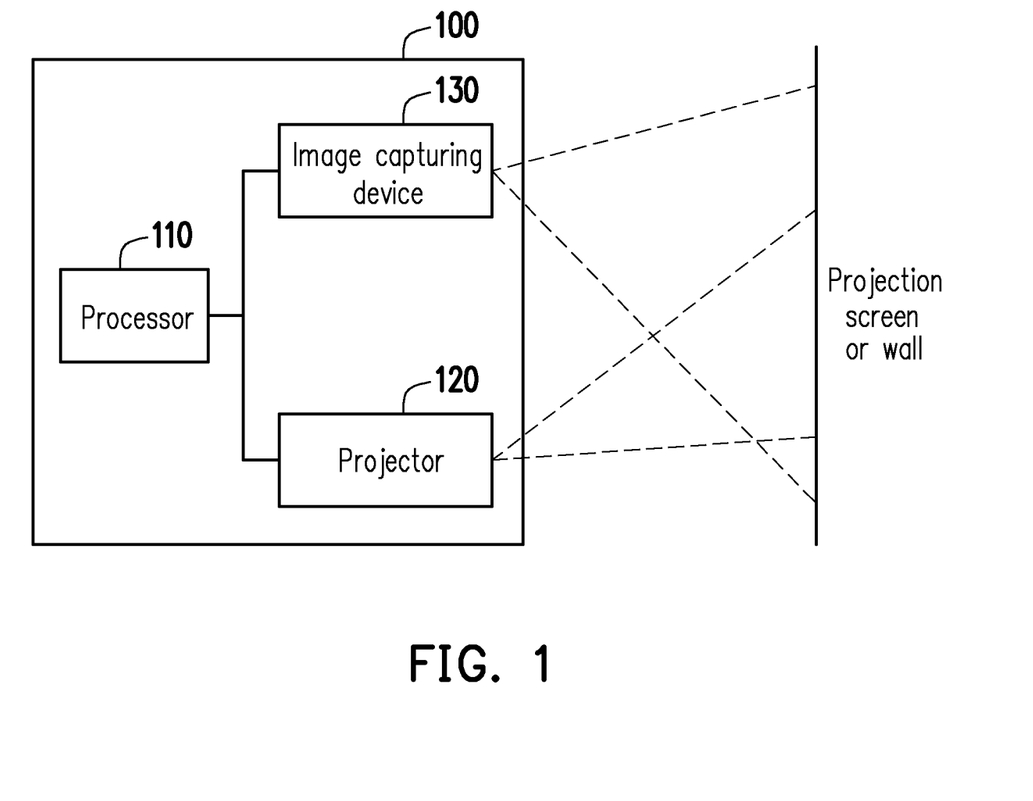
FIG. 1 is a schematic diagram showing a projection system according to an embodiment of the disclosure.

FIG. 1 is a schematic diagram showing a projection system 100 according to an embodiment of the disclosure. The projection system 100 is, for example, an ultra-short throw projection system. The projection system 100 may include a processor 110, a projector 120, and an image capturing device 130. The processor 110 may be coupled to the projector 120 and the image capturing device 130 to control the projector 120 and the image capturing device 130.

The processor 110 is, for example, a central processing unit (CPU), or any other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements or a combination of the above elements.

The projector 120 may include a plurality of elements, such as an illumination module having at least one light-emitting device, and the elements, controlled by the processor 110, including a light valve, a lamp, a lens, or/and a projection lens, but is not limited thereto. The processor 110 may control the projector 120 to project an image on a projection surface (e.g., a projection screen or a wall) to form a projection area.

The image capturing device 130 is a device, for example a camera, that may be configured to capture an image. The image capturing device 130 may obtain a captured image including the projection area toward the projection surface. The captured image obtained by the image capturing device 130 may serve to calibrate the projection area of the projector 120, to accordingly reduce distortion of the projected image caused by the projector 120 using a fisheye lens or a wide-angle lens.

Figure 2:
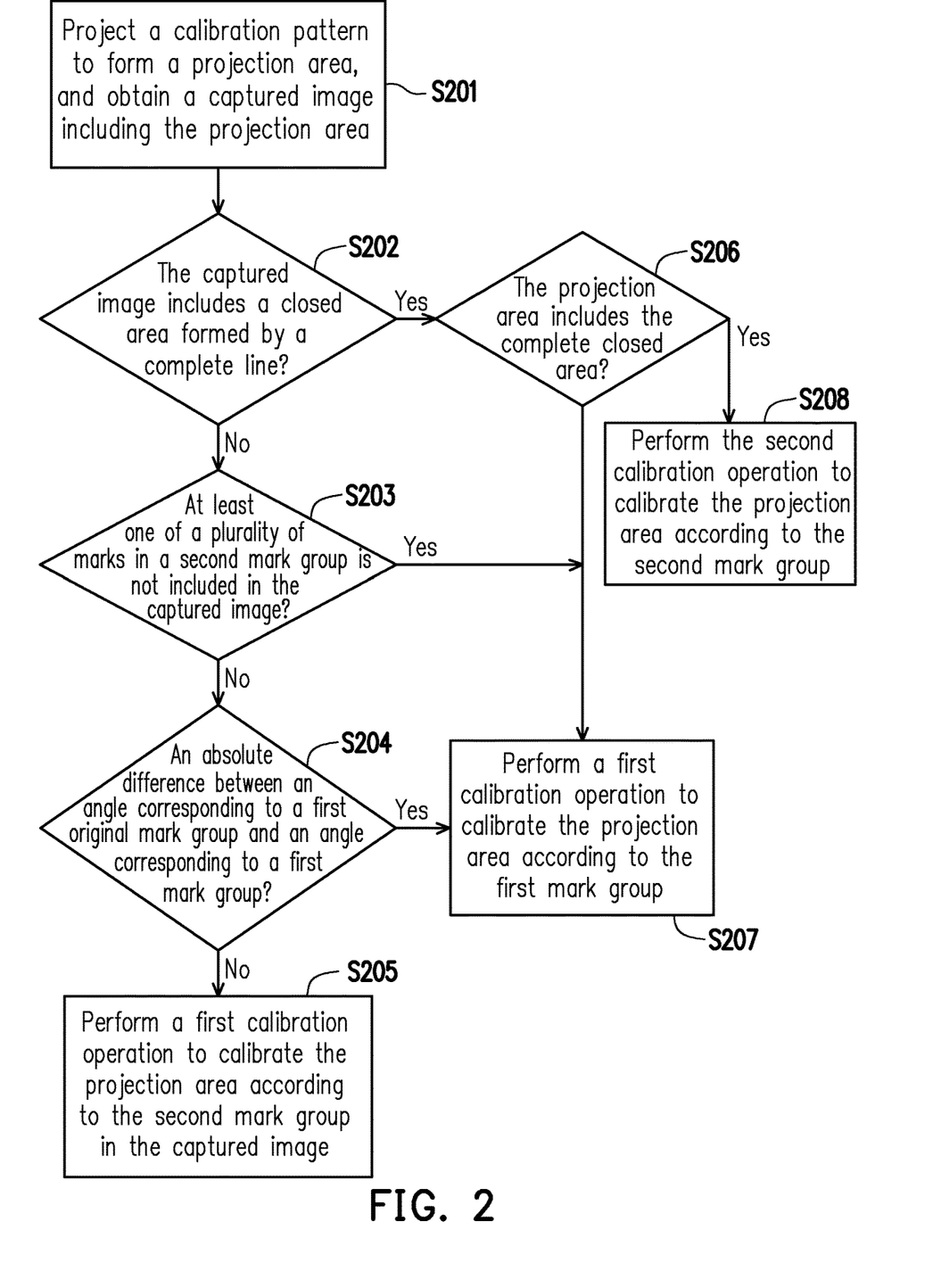
FIG. 2 is a flowchart of a method for calibrating a projection area of a projector according to an embodiment of the disclosure.

FIG. 2 is a flowchart of a method for calibrating a projection area of a projector according to an embodiment of the disclosure. The method may be implemented by the projection system 100 as shown in FIG. 1. In step S201, a calibration pattern is projected by the projector 120 to form a projection area, and a captured image including the projection area may be obtained by the image capturing device 130. For example, the projector 120 may be controlled by the processor 110 to project the calibration pattern to form the projection area.

Figure 3:
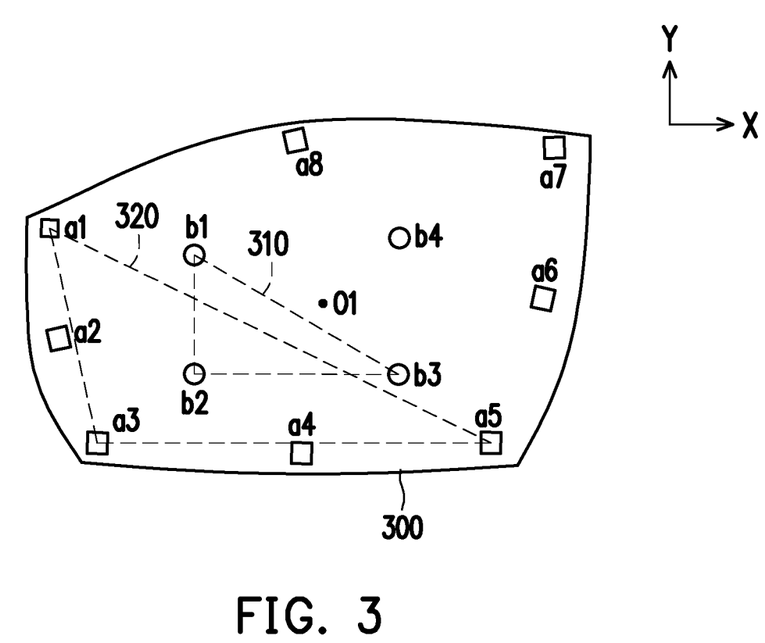
FIG. 3 is a schematic diagram showing a calibration pattern according to an embodiment of the disclosure.
Figure 4:
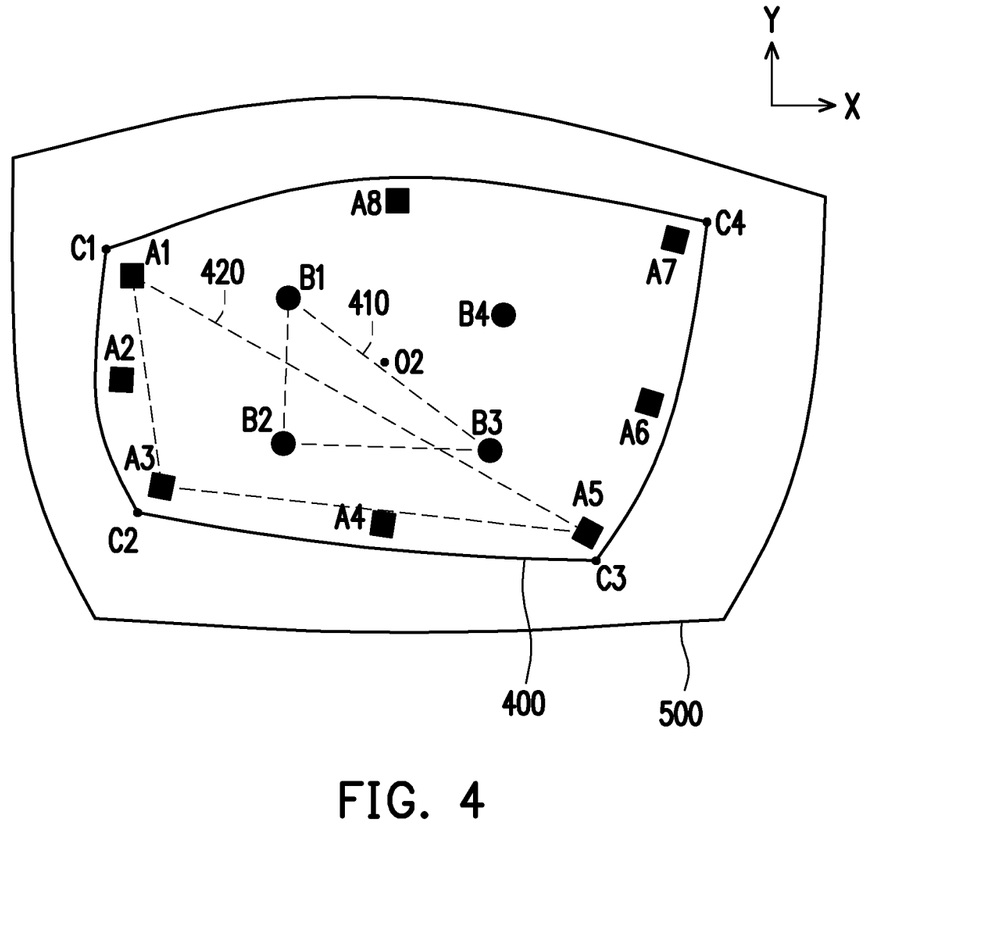
FIG. 4 is a schematic diagram showing a projection area and a captured image according to an embodiment of the disclosure.

With reference to FIG. 3 and FIG. 4, FIG. 3 is a schematic diagram showing a calibration pattern 300 according to an embodiment of the disclosure, and FIG. 4 is a schematic diagram showing a projection area 400 and a captured image 500 according to an embodiment of the disclosure. The calibration pattern 300 may be pre-stored in the storage medium of the processor 110. Before the projector 120 leaves the factory, the processor 110 may project the original image corresponding to the calibration pattern 300 onto a projection surface by the projector 120, and capture the original image projected onto the projection surface by the image capturing device 130 to store the original image as the calibration pattern 300. The original image may be a rectangle. Since the lens of the projector 120 may be a fisheye lens or a wide-angle lens, the calibration pattern 300 may become a distorted rectangle compared to the original image.

The projector 120 may project the calibration pattern 300 pre-stored in the processor 110 to form the projection area 400, and may obtain the captured image 500 including the projection area 400 by the image capturing device 130. The projection area 400 is a deformed rectangle, for example. The projection area 400 may include four vertices, respectively a vertex C1, a vertex C2, a vertex C3, and a vertex C4, as shown in FIG. 4. The vertex is the point where two sides meet.

The calibration pattern 300 may include a first original mark group. The first original mark group may includes four original marks, respectively an original mark b1, an original mark b2, an original mark b3, and an original mark b4. The four original marks in the first original mark group may respectively correspond to the four vertices C1 to C4 of the projection area 400. Specifically, the original mark b1 may correspond to the vertex C1, the original mark b2 may correspond to the vertex C2, the original mark b3 may correspond to the vertex C3, and the original mark b4 may correspond to the vertex C4. The original mark b1 (or the vertex C1) may be the opposite vertex of the original mark b3 (or the vertex C3), and the original mark b2 (or the vertex C2) may be the opposite vertex of the original mark b4 (or the vertex C4).

The calibration pattern 300 may further include a second original mark group. The second original mark group may include eight original marks, respectively an original mark a1, an original mark a2, an original mark a3, an original mark a4, an original mark a5, an original mark a6, an original mark a7, and an original mark a8. Four of the original marks of the second original mark group may respectively correspond to the four vertices C1 to C4 of the projection area 400. Specifically, the original mark a1 may correspond to the vertex C1, the original mark a3 may correspond to the vertex C2, the original mark a5 may correspond to the vertex C3, and the original mark a7 may correspond to the vertex C4. The original mark a1 may be the opposite vertex of the original mark a5, and the original mark a3 may be the opposite vertex of the original mark a7. The remaining four original marks of the second original mark group may respectively correspond to connection lines or common edges between two vertices of the projection range 400. Specifically, the original mark a2 may correspond to a connection line $\overline{C1C2}$ between the vertex C1 and the vertex C2. In other words, the original mark a2 may correspond to the connection line $\overline{C1C2}$ and be located between the original mark a1 and the original mark a3. The original mark a4 may correspond to a connection line $\overline{C2C3}$ between the vertex C2 and the vertex C3. In other words, the original mark a4 may correspond to the connection line $\overline{C2C3}$ and be located between the original mark a3 and the original mark a5. The original mark a6 may correspond to a connection line $\overline{C3C4}$ between the vertex C3 and the vertex C4. In other words, the original mark a6 may correspond to the connection line $\overline{C3C4}$ and be located between the original mark a5 and the original mark a7. The original mark a8 may correspond to a connection line $\overline{C4C1}$ between the vertex C4 and the vertex C1. In other words, the original mark a8 may correspond to the connection line $\overline{C4C1}$ and be located between the original mark a1 and the original mark a7.

The first original mark group may surround a center point O1 of the calibration pattern 300 and the second original mark group may surround the first original mark group. In an embodiment, if an original mark in the first original mark group and another original mark in the second original mark group correspond to the same vertex of the projection area 400, a distance between the original mark in the first original mark group and the center point O1 of the calibration pattern 300 may be less than or equal to a distance between the original mark in the second original mark group and the center point O1 of the calibration pattern 300. Taking the vertex C1 of the projection area 400 as an example, a distance $|\overline{b1O1}|$ between the original mark b1 in the first original mark group and the center point O1 is less than a distance $|\overline{a1O1}|$ between the original mark a1 in the second original mark group and the center point O1. Similarly, a distance $|\overline{b2O1}|$ between the original mark b2 in the first original mark group and the center point O1 may be less than a distance $|\overline{a3O1}|$ between the original mark a3 in the second original mark group and the center point O1, a distance $|\overline{b3O1}|$ between the original mark b3 in the first original mark group and the center point O1 may be less than a distance $|\overline{a5O1}|$ between the original mark a5 in the second original mark group and the center point O1, and a distance $|\overline{b4O1}|$ between the original mark b4 in the first original mark group and the center point O1 may be less than a distance $|\overline{a7O1}|$ between the original mark a7 in the second original mark group and the center point O1.

In an embodiment, if an original mark in the first original mark group and another original mark in the second original mark group correspond to the same vertex of the projection area 400, a distance between the original mark in the first original mark group and the center point O1 of the calibration pattern 300 in the first direction may be less than or equal to a distance between the original mark in the second original mark group and the center point O1 of the calibration pattern 300 in the first direction, and a distance between the original mark in the first original mark group and the center point O1 of the calibration pattern 300 in the second direction may be less than or equal to a distance between the original mark in the second original mark group and the center point O1 of the calibration pattern 300 in the second direction. The first direction and the second direction may be perpendicular to each other. For example, the first direction may be the X direction of the Cartesian coordinate system, and the second direction may be the Y direction of the Cartesian coordinate system. Taking the vertex C1 of the projection area 400 as an example, the length of the orthogonal projection of the distance $|\overline{b1O1}|$ between the original mark b1 in the first original mark group and the center point O1 on the X-axis may be less than the length of the orthogonal projection of the distance $|\overline{a1O1}|$ between the original mark a1 in the second original mark group and the center point O1 on the X-axis, and the length of the orthogonal projection of the distance $|\overline{b1O1}|$ on the Y-axis may be less than the length of the orthogonal projection of the distance $|\overline{a1O1}|$ on the Y-axis.

Figure 5:
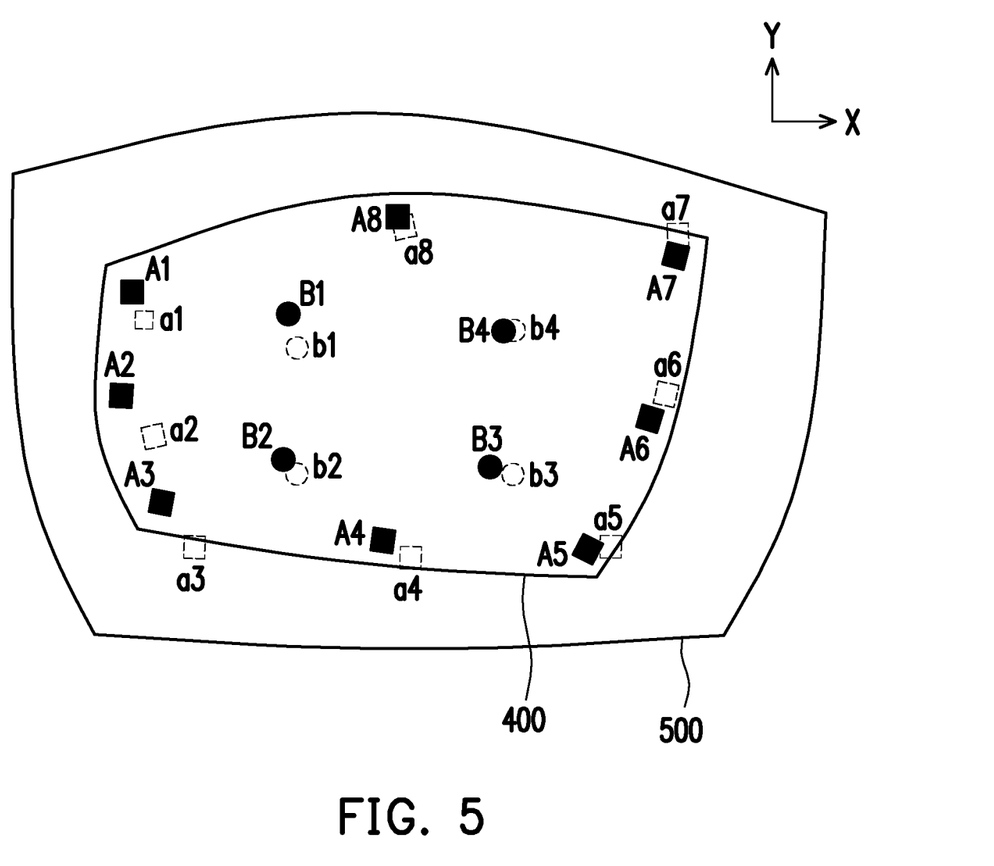
FIG. 5 is a schematic diagram showing offsets between original marks in a calibration pattern and marks in a captured image according to an embodiment of the disclosure.

The captured image 500 may include a first mark group corresponding to the first original mark group. The first mark group may include four marks, respectively a mark B1 corresponding to the original mark b1 (or the vertex C1), a mark B2 corresponding to the original mark b2 or (the vertex C2), a mark B3 corresponding to the original mark b3 (or the vertex C3), and a mark B4 corresponding to the original mark b4 (or the vertex C4). Depending on different application scenarios of the projector 120, an offset may be generated between the first mark group and the first original mark group. As shown in FIG. 5, the marks B1, B2, B3, and B4 in the captured image 500 cannot be completely overlapped with the original marks b1, b2, b3, and b4 in the calibration pattern 300 pre-stored in the projection system 100.

With reference back to FIG. 3 and FIG. 4, the captured image 500 may further include a second mark group corresponding to the second original mark group. The second mark group may include eight marks, respectively a mark A1 corresponding to the original mark a1 (or the vertex C1), a mark A2 corresponding to the original mark a2 (or the connection line $\overline{C1C2}$), a mark A3 corresponding to the original mark a3 (or the vertex C2), a mark A4 corresponding to the original mark a4 (or the connection line $\overline{C2C3}$), a mark A5 corresponding to the original mark a5 (or the vertex C3), a mark A6 corresponding to the original mark a6 (or the connection line $\overline{C3C4}$), a mark A7 corresponding to the original mark a7 (or the vertex C4), and a mark A8 corresponding to the original mark a8 (or the connection line $\overline{C4C1}$). Depending on different application scenarios of the projector 120, an offset may be generated between the second mark group and the second original mark group. As shown in FIG. 5, the marks A1, A2, A3, A4, A5, A6, A7, and A8 in the captured image 500 cannot be completely overlapped with the original marks a1, a2, a3, a4, a5, a6, a7, and a8 in the calibration pattern 300 pre-stored in the projection system 100.

Figure 7:
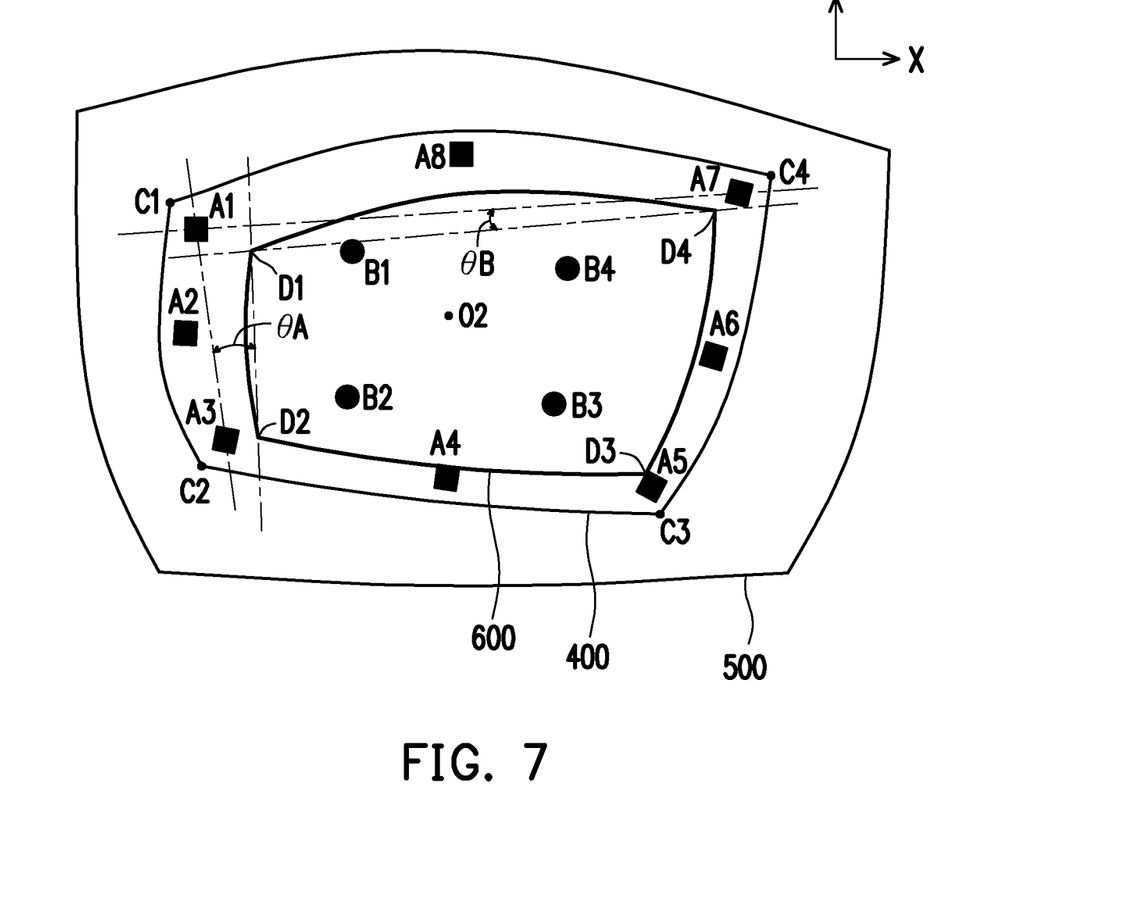
FIG. 7 is a schematic diagram showing the projection area including the closed area according to an embodiment of the disclosure.

With reference back to FIG. 2, in step S202, the processor 110 may perform image recognition on the captured image 500 to determine whether the captured image 500 includes a closed area formed by a complete line (e.g., a closed area 600 having a frame as shown in FIG. 7). If the processor 110 determines that the captured image 500 includes a closed area formed by a complete line, the flow proceeds to step S206. If the processor 110 determines that the captured image 500 does not include a closed area formed by a complete line, the flow proceeds to step S203. Step S202 and step S206 may serve to check whether the captured image 500 includes a projection screen having a complete frame.

In step S203, the processor 110 may perform image recognition on the captured image 500 to determine whether at least one of the plurality of marks in the second mark group is not included in the captured image 500. If at least one of the plurality of marks in the second mark group is not included in the captured image 500, the flow proceeds to step S207. If each of the plurality of marks in the second mark group is included in the captured image 500, the flow proceeds to step S204.

In an embodiment, the plurality of marks in the second mark group in the captured image 500 may include three marks respectively corresponding to three vertices of the projection area 400. For example, the three vertices are the vertex C1, the vertex C2, and the vertex C3, and the three marks are the mark A1, the mark A3, and the mark A5. If at least one of the mark A1, the mark A3, and the mark A5 is not included in the captured image 500, the processor 110 may determine that at least one of the plurality of marks in the second mark group is not included in the captured image 500, and then the flow proceeds to step S207. If each of the mark A1, the mark A3, and the mark A5 is included in the captured image 500, the processor 110 may determine that each of the plurality of marks in the second mark group is included in the captured image 500, and then the flow proceeds to step S204.

In step S204, the processor 110 may determine whether an absolute difference between an included angle of a triangle corresponding to the first original mark group and an included angle of a triangle corresponding to the first mark group is greater than a threshold. If the absolute difference is greater than the threshold, the flow proceeds to step S207. If the absolute difference is less than or equal to the threshold, the flow proceeds to step S205.

Specifically, the processor 110 may obtain a triangle formed by three original marks in the first original mark group in the calibration pattern 300. The three original marks may respectively correspond to the three vertices of the projection area 400. For example, the three original marks are the original mark b1, the original mark b2, and the original mark b3 respectively corresponding to the vertex C1, the vertex C2, and the vertex C3. For example, the triangle is a triangle 310 (shown in FIG. 3). In addition, the processor 110 may obtain a triangle formed by three marks in the first mark group in the captured image 500. The three marks may respectively correspond to the three vertices of the projection area 400. For example, the three marks are the mark B1, the mark B2, and the mark B3 respectively corresponding to the original mark b1, the original mark b2, and the original mark b3. For example, the triangle is a triangle 410 corresponding to the triangle 310 (shown in FIG. 4).

Next, the processor 110 may obtain an absolute difference between an included angle of the triangle 310 of the calibration pattern 300 and a corresponding included angle of the triangle 410 of the captured image 500, and determine whether the absolute difference is greater than a threshold. For example, the processor 110 may calculate an absolute difference between an included angle ∠b2b1b3 in the triangle 310 corresponding to the vertex C1 and an included angle ∠B2B1B3 in the triangle 410 corresponding to the vertex C1, and determine whether the absolute difference is greater than a threshold to determine to perform step S205 or step S207.

In step S205, the processor 110 may perform a first calibration operation to calibrate the projection area 400 according to the plurality of marks in the second mark group in the captured image 500 and the plurality of original marks in the second original mark group. The first calibration operation is applicable to calibrating the projection area 400 that is not projected within the closed area 600 having a frame, namely applicable to calibrating the projection area of a frameless projection system. For example, the plurality of marks include the mark A1, the mark A3, and the mark A5, and the plurality of original marks include the original mark a1, the original mark a3, and the original mark a5.

Specifically, the processor 110 may first determine the offset direction of the projection area 400. The processor 110 may obtain two original marks respectively corresponding to two adjacent vertices of the projection area 400 from the second original mark group of the calibration pattern 300, and further obtain another original mark corresponding to a connection line between the two adjacent vertices from the second original mark group. In addition, the processor 110 may obtain three marks corresponding to the three original marks from the second mark group of the captured image 500. For example, the three original marks include the original mark a1 and the original mark a3 respectively corresponding to the vertex C1 and the vertex C2 and the original mark a2 corresponding to the connection line $\overline{C1C2}$. For example, the three marks include the mark A1, the mark A2, and the mark A3 respectively corresponding to the original mark a1, the original mark a2, and the original mark a3.

Figure 6:
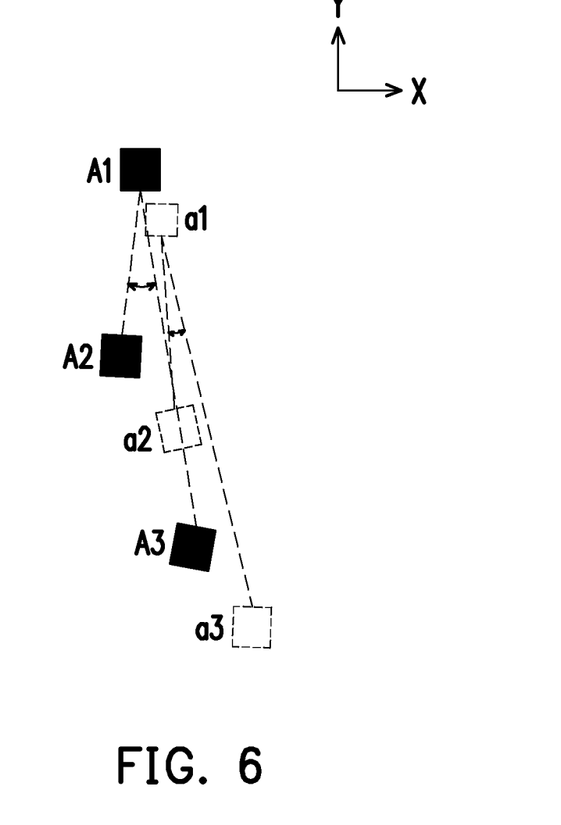
FIG. 6 is a schematic diagram showing determination of an offset direction of a projection area according to a plurality of marks in a second mark group according to an embodiment of the disclosure.

The original mark a1, the original mark a2, and the original mark a3 are each offset toward the negative X direction compared to the center point O1 of the calibration pattern 300. The mark A1, the mark A2, and the mark A3 are each offset toward the negative X direction compared to a center point O2 of the projection area 400. The processor 110 may determine whether the projection area 400 is offset toward the negative X direction according to the original mark a1, the original mark a2, the original mark a3, the mark A1, the mark A2, and the mark A3. FIG. 6 is a schematic diagram showing determination of an offset direction of a projection area according to a plurality of marks in a second mark group according to an embodiment of the disclosure. If an included angle ∠a2a1a3 is less than an included angle ∠A2A1A3, the processor 110 may determine that the projection area 400 is offset toward the negative X direction. The included angle ∠a2a1a3 is the included angle between a connection line $\overline{a1a2}$ and a connection line $\overline{a1a3}$, and the included angle ∠A2A1A3 is the included angle between a connection line $\overline{A1A2}$ and a connection line $\overline{A1A3}$. Accordingly, the processor 110 may determine to calibrate the projection area 400 using an angle variation between a triangle corresponding to the original mark a1 and the original mark a3 (e.g., a triangle 320 formed by the original marks a1, a3, and a5 or a triangle formed by the original marks a1, a3, and a7) and a triangle corresponding to the mark A1 and the mark A3 (e.g., a triangle 420 formed by the marks A1, A3, and A5 or a triangle formed by the marks A1, A3, and A7). The three included angles of each of the two triangles respectively correspond to three vertices of the projection area 400. The processor 110 may calibrate the projection area 400 by reducing the angle variation.

It is assumed that the processor 110 determines to calibrate the projection area 400 using the triangle 320 formed by the original mark a1, the original mark a3, and the original mark a5 and the triangle 420 formed by the mark A1, the mark A3, and the mark A5. The processor 110 may calculate the difference between any two corresponding included angles of the triangle 320 and the triangle 420 to obtain the angle variation. For example, the processor 110 may calculate the difference between an included angle ∠a3a1a5 and an included angle ∠A3A1A5 and the difference between an included angle ∠a1a3a5 and an included angle ∠A1A3A5. The processor 110 may correspondingly adjust the projection area 400 by resetting the two differences to zero to calibrate the projection area 400.

Similarly, the processor 110 may determine whether the projection area 400 is offset toward the positive Y direction according to the original marks a1, a8, and a7 and the marks A1, A8, and A7. If the projection area 400 is offset toward the positive Y direction, the processor 110 may determine to perform vertical calibration on the projection area 400 using a triangle corresponding to the original marks a1 and a7 and a triangle corresponding to the marks A1 and A7. The processor 110 may determine whether the projection area 400 is offset toward the positive X direction according to the original marks a7, a6, and a5 and the marks A7, A6, and A5. If the projection area 400 is offset toward the positive X direction, the processor 110 may determine to perform horizontal calibration on the projection area 400 using a triangle corresponding to the original marks a7 and a5 and a triangle corresponding to the marks A7 and A5. The processor 110 may determine whether the projection area 400 is offset toward the negative Y direction according to the original marks a3, a4, and a5 and the marks A3, A4, and A5. If the projection area 400 is offset toward the negative Y direction, the processor 110 may determine to perform vertical calibration on the projection area 400 using a triangle corresponding to the original marks a3 and a5 and a triangle corresponding to the marks A3 and A5.

If the processor 110 determines that the captured image 500 includes a closed area formed by a complete line, the flow proceeds to step 206. In step S206, the processor 110 may perform image recognition on the captured image 500 to determine whether the projection area 400 in the captured image 500 includes a complete closed area (e.g., the closed area 600 shown in FIG. 7). If the projection area 400 includes a complete closed area, the flow proceeds to step S208. If the projection area 400 does not include a complete closed area, the flow proceeds to step S207.

In step S207, the processor 110 may perform a first calibration operation to calibrate the projection area 400 according to the plurality of marks in the first mark group in the captured image 500 and the plurality of original marks in the first original mark group. The first calibration operation is applicable to calibrating the projection area 400 that is not projected within a closed area having a frame (e.g., within a projection screen). For example, the plurality of marks include the mark B1, the mark B2, and the mark B3, and the plurality of original marks include the original mark b1, the original mark b2, and the original mark b3.

Specifically, the processor 110 may first determine the offset direction of the projection area 400. The determination of the offset direction of the projection area 400 may be the same as described in step S205, and will therefore not be repeatedly described here. The original mark b1 and the original mark b2 are each offset toward the negative X direction compared to the center point O1 of the calibration pattern 300. The mark B1 and the mark B2 are each offset toward the negative X direction compared to the center point O2 of the projection area 400. Accordingly, if the processor 110 determines that the projection area 400 is offset toward the negative X direction, the processor 110 may determine to calibrate the projection area 400 using an angle variation between a triangle corresponding to the original mark b1 and the original mark b2 (e.g., the triangle 310 formed by the original marks b1, b2, and b3 or a triangle formed by the original marks b1, b2, and b4) and a triangle corresponding to the mark B1 the mark B2 triangle (e.g., the triangle 410 formed by the marks B1, B2, and B3 or a triangle formed by the marks B1, B2, and B4). The three included angles of each of the two triangles respectively correspond to three vertices of the projection area 400. The processor 110 may calibrate the projection area 400 by reducing the angle variation.

It is assumed that the processor 110 determines to calibrate the projection area 400 using the triangle 310 formed by the original mark b1, the original mark b2, and the original mark b3 and the triangle 410 formed by the mark B1, the mark B2, and the mark B3. The processor 110 may calculate the difference between any two corresponding included angles of the triangle 310 and the triangle 410 to obtain the angle variation. For example, the processor 110 may calculate the difference between the included angle ∠b2b1b3 and the included angle ∠B2B1B3 and the difference between an included angle ∠b1b2b3 and an included angle ∠B1B2B3. The processor 110 may correspondingly adjust the projection area 400 by resetting the two differences to zero to calibrate the projection area 400.

Similarly, if the projection area 400 is offset toward the positive Y direction, the processor 110 may determine to perform vertical calibration on the projection area 400 using a triangle corresponding to the original marks b1 and b4 and a triangle corresponding to the marks B1 and B4. If the projection area 400 is offset toward the positive X direction, the processor 110 may determine to perform horizontal calibration on the projection area 400 using a triangle corresponding to the original marks b4 and b3 and a triangle corresponding to the marks B4 and B3. If the projection area 400 is offset toward the negative Y direction, the processor 110 may determine to perform vertical calibration on the projection area 400 using a triangle corresponding to the original marks b2 and b3 and a triangle corresponding to the marks B2 and B3.

If the projection area 400 includes a complete closed area, the flow proceeds to step S208. In step S208, the processor 110 may perform a second calibration operation to calibrate the projection area 400 according to the plurality of marks in the second mark group. The second calibration operation is applicable to adjusting the projection area 400 to be within the closed area 600. For example, the plurality of marks include the mark A1, the mark A3, the mark A5, and the mark A7 respectively corresponding to the vertex C1, the vertex C2, the vertex C3, and the vertex C4 of the projection area 400.

Specifically, the processor 110 may perform image recognition on the captured image 500 to identify a plurality of corners of the closed area 600. The plurality of corners may include a corner D1, a corner D2, a corner D3, and a corner D4. The corner D1, the corner D2, the corner D3, and the corner D4 of the closed area 600 respectively correspond to the vertex C1, the vertex C2, the vertex C3, and the vertex C4 of the projection area 400, as shown in FIG. 7. FIG. 7 is a schematic diagram showing the projection area 400 including the closed area 600 according to an embodiment of the disclosure.

In the captured image 500, the closed area 600 may be included in the projection area 400. In an embodiment, if a corner of the closed area 600 and a mark in the second mark group correspond to the same vertex of the projection area 400, a distance between the corner corresponding to the vertex and the center point O2 of the projection area 400 may be less than a distance between the mark corresponding to the same vertex and the center point O2. For example, a distance |$\overline{D1O2}$| between the corner D1 and the center point O2 may be less than a distance |$\overline{A1O2}$| between the mark A1 and the center point O2, a distance |$\overline{D2O2}$| between the corner D2 and the center point O2 may be less than a distance |$\overline{A3O2}$| between the mark A3 and the center point O2, a distance |$\overline{D3O2}$| between the corner D3 and the center point O2 may be less than a distance |$\overline{A5O2}$| between the mark A5 and the center point O2, and a distance |$\overline{D4O2}$| between the corner D4 and the center point O2 may be less than a distance |$\overline{A7O2}$| between the mark A7 and the center point O2.

In an embodiment, if a corner of the closed area 600 and a mark in the second mark group correspond to the same vertex of the projection area 400, a distance between the corner corresponding to the vertex and the center point O2 in the first direction may be less than a distance between the mark corresponding to the same vertex and the center point O2 in the first direction, and a distance between the corner corresponding to the vertex and the center point O2 in the second direction may be less than a distance between the mark corresponding to the same vertex and the center point O2 in the second direction. The first direction and the second direction may be perpendicular to each other. For example, the first direction may be the X direction of the Cartesian coordinate system, and the second direction may be the Y direction of the Cartesian coordinate system. Taking the vertex C1 of the projection area 400 as an example, the length of the orthogonal projection of the distance |$\overline{D1O2}$| between the corner D1 and the center point O2 on the X-axis may be less than the length of the orthogonal projection of the distance |$\overline{A1O2}$| between the mark A1 and the center point O2 on the X-axis, and the length of the orthogonal projection of the distance |$\overline{D1O2}$| on the Y-axis may be less than the length of the orthogonal projection of the distance |$\overline{A1O2}$| on the Y-axis.

After identifying the corners of the closed area 600, the processor 110 may calibrate the projection area according to the corners and the marks in the second mark group corresponding to the corners. Taking the corner D1 and the mark A1 corresponding to the vertex C1 as an example, the processor 110 may obtain a straight line $\overleftrightarrow{A1A3}$ formed by the mark A1 and the mark A3, and may obtain a straight line $\overleftrightarrow{D1D2}$ formed by the corner D1 and the corner D2. The processor 110 may further obtain an included angle θA between the straight line $\overleftrightarrow{A1A3}$ and the straight line $\overleftrightarrow{D1D2}$. In addition, the processor 110 may obtain a straight line $\overrightarrow{A1A7}$ formed by the mark A1 and the mark A7, and may obtain a straight line $\overrightarrow{D1D4}$ formed by the corner D1 and the corner D4. The processor 110 may further obtain an included angle θB between the straight line $\overleftrightarrow{A1A7}$ and the straight line $\overleftrightarrow{D1D4}$. The processor 110 may adjust the included angle θA and the included angle θB so that the included angle θA and the included angle θB are close to zero to calibrate the projection area 400.

When the included angle θA and the included angle θB are adjusted to be zero, the position of the mark A1 may be overlapped with the position of the corner D1 of the closed area 600. According to the relative position of the mark A of the second mark group relative to the corresponding vertex C1 of the projection area 400, the processor 110 may further update the position of the mark A1, so that the distance between the mark A1 and the center point O2 in the first direction is less than the distance between the corner D1 and the center point O2 in the first direction, and the distance between the mark A1 and the center point O2 in the second direction is less than the distance between the corner D1 and the center point O2 in the second direction. The first direction and the second direction may be perpendicular to each other. For example, the first direction may be the X direction of the Cartesian coordinate system, and the second direction may be the Y direction of the Cartesian coordinate system.

Figure 8:
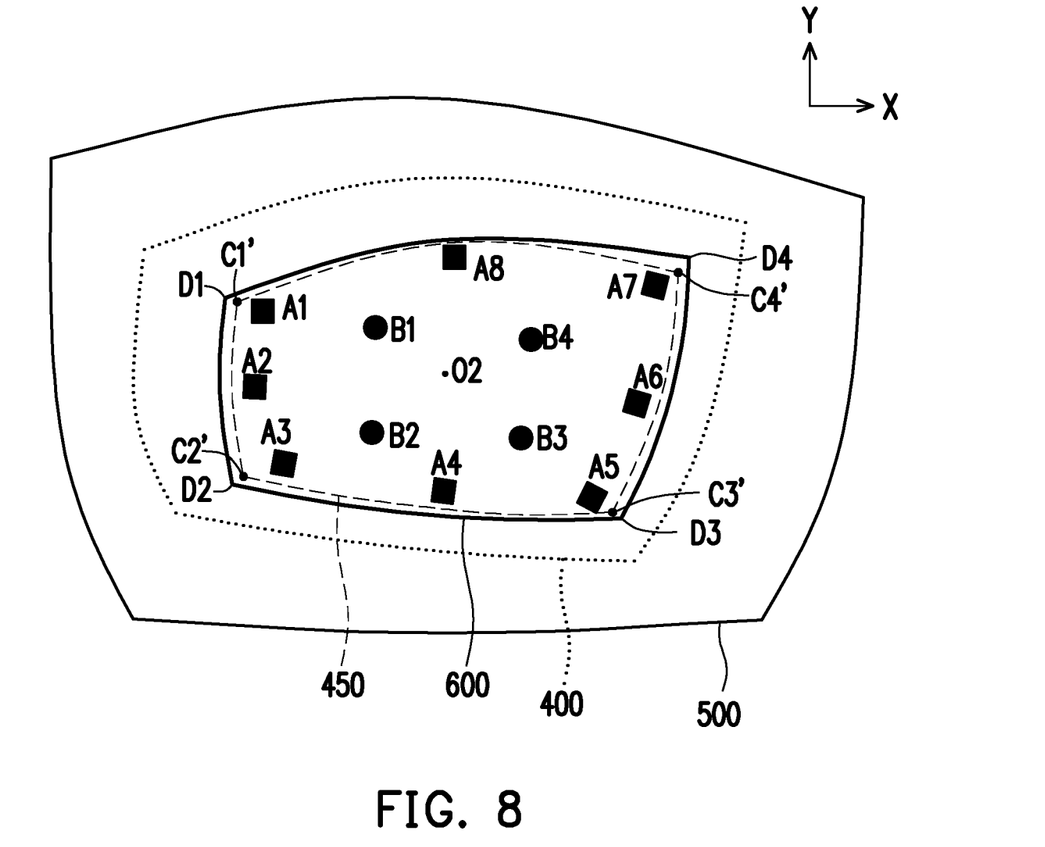
FIG. 8 is a schematic diagram showing a calibrated projection area according to an embodiment of the disclosure.

On a similar basis, the processor 110 may update the positions of the marks A1, A3, A5, and A7 in the projection area 400 to accordingly generate a calibrated projection area 450. FIG. 8 is a schematic diagram showing a calibrated projection area according to an embodiment of the disclosure. The projection area 450 is a calibrated projection area. In other words, the uncalibrated projection area 400 is adjusted to the calibrated projection area 450. The calibrated projection area 450 may be completely included within the closed area 600. Alternatively a vertex C1' to a vertex C4' of the calibrated projection area 450 may be overlapped with the corners D1 to D4 of the closed area 600.

Based on the above, if the projection area 400 in the captured image 500 includes the closed area 600 formed by a complete line (e.g., a projection screen having a frame), the processor 110 may perform the second calibration operation to adjust the image projected by the projector 120 to be completely maintained within the closed area 600. Comparatively, if the processor 110 does not identify any closed area 600 in the captured image 500 or the projection area 400 does not include the complete closed area 600, the processor 110 may perform the first calibration operation to calibrate the projection area 400 without considering the closed area 600.

In addition, during the first calibration operation, using the first original mark group and the first mark group to calibrate the projection area 400 changes the projection area 400 less significantly compared to using the second original mark group and the second mark group. If the variation between the first original mark group and the first mark group is sufficient for calibrating the projection area 400, the processor 110 may prioritize using the first original mark group and the first mark group to perform the first calibration operation to calibrate the projection area 400 by a slight adjustment thereto. If the variation between the first original mark group and the first mark group is not sufficient for calibrating the projection area 400, the processor 110 then uses the second original mark group and the second mark group to perform the first calibration operation.

Figure 9:
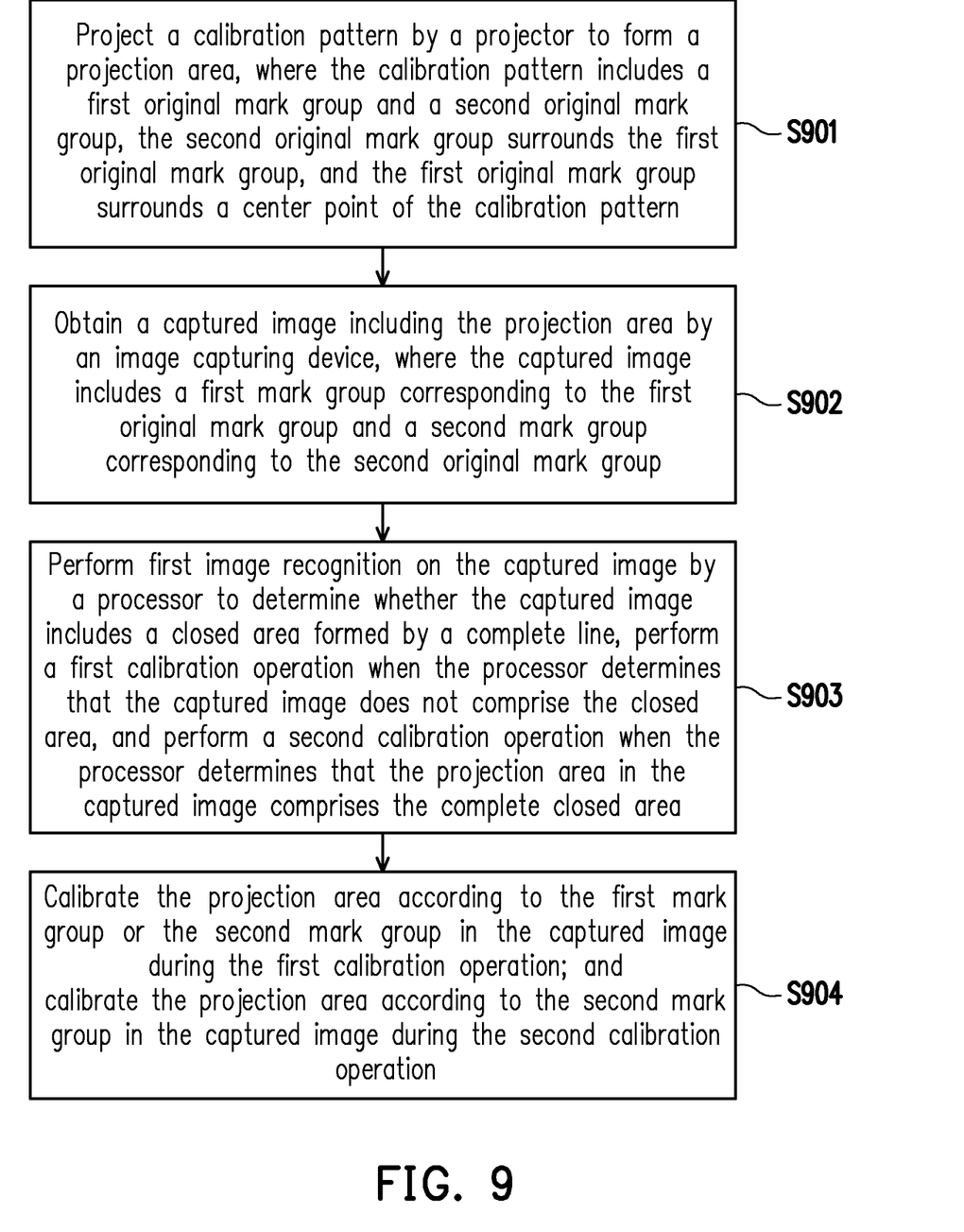
FIG. 9 is a flowchart of a method for calibrating a projection area of a projector according to another embodiment of the disclosure.

FIG. 9 is a flowchart of a method for calibrating a projection area of a projector according to another embodiment of the disclosure. The method may be implemented by the projection system 100 as shown in FIG. 1. In step S901, a calibration pattern is projected by a projector to form a projection area. The calibration pattern includes a first original mark group and a second original mark group. The second original mark group surrounds the first original mark group and the first original mark group surrounds a center point of the calibration pattern. In step S902, a captured image including the projection area is obtained by an image capturing device. The captured image includes a first mark group corresponding to the first original mark group and a second mark group corresponding to the second original mark group. In step S903, first image recognition is performed on the captured image by a processor to determine whether the captured image includes a closed area formed by a complete line. A first calibration operation is performed when the processor determines that the captured image does not include the closed area, and a second calibration operation is performed when the processor determines that the projection area in the captured image includes a complete closed area. In step S904, the projection area is calibrated according to the first mark group or the second mark group in the captured image during the first calibration operation. The projection area is calibrated according to the second mark group in the captured image during the second calibration operation.

In summary of the foregoing, in the projection system of the disclosure, the calibration pattern may be projected by the projector and the captured image of the projection area may be obtained by the image capturing device. The calibration pattern may include the first original mark group and the second original mark group surrounding the first original mark group, which are respectively applicable to calibrating the projection area in different scenarios. When the projection system identifies a closed area having a complete frame (e.g., a projection screen), the projection system may calibrate the projection area of the projector using the second original mark group. When the projection system cannot identify a closed area having a complete frame, the projection system may determine whether the second original mark group may serve to calibrate the projection area. The projection system may determine to calibrate the projection area using the first original mark group or the first original mark group according to the determination result. Accordingly, regardless of whether or not the projection system identifies a closed area having a complete frame, the projection system can determine the appropriate calibration method for calibrating the projection area generated by the ultra-short throw lens.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for calibrating a projection area of a projector, comprising:

projecting a calibration pattern by the projector to form the projection area, wherein the calibration pattern comprises a first original mark group and a second original mark group, the second original mark group surrounds the first original mark group, and the first original mark group surrounds a center point of the calibration pattern;

obtaining a captured image comprising the projection area by an image capturing device, wherein the captured image comprises a first mark group corresponding to the first original mark group of the calibration pattern and a second mark group corresponding to the second original mark group of the calibration pattern;

performing first image recognition on the captured image by a processor to determine whether the captured image comprises a closed area formed by a complete line, performing a first calibration operation when the processor determines that the captured image does not comprise the closed area, and performing a second calibration operation when the processor determines that the projection area in the captured image comprises the complete closed area;

calibrating the projection area according to the first mark group or the second mark group in the captured image during the first calibration operation; and calibrating the projection area according to the second mark group in the captured image during the second calibration operation.

2. The method of claim 1, wherein the projection area comprises a first vertex, a second vertex, and a third vertex, the first original mark group comprises a first original mark corresponding to the first vertex, a second original mark corresponding to the second vertex, and a third original mark corresponding to the third vertex, and the first mark group comprises a first mark corresponding to the first vertex, a second mark corresponding to the second vertex, and a third mark corresponding to the third vertex, wherein the first original mark, the second original mark, and the third original mark form a first triangle, and the first mark, the second mark, and the third mark form a second triangle.

3. The method of claim 2, wherein the first triangle comprises a first included angle corresponding to the first vertex and the second triangle comprises a second included angle corresponding to the first vertex; and calibrating the projection area according to the first mark group or the second mark group in the captured image during the first calibration operation comprises:
   determining to calibrate the projection area using an angle variation between the first mark, the second mark, and the third mark of the first mark group and the first original mark, the second original mark, and the third original mark of the first original mark group in response to an absolute difference between the first included angle and the second included angle being greater than a threshold.

4. The method of claim 3, wherein the second original mark group of the calibration pattern comprises a fourth original mark corresponding to the first vertex, a fifth original mark corresponding to the second vertex, and a sixth original mark corresponding to the third vertex, wherein a distance between the first original mark and the center point of the calibration pattern is less than or equal to a distance between the fourth original mark and the center point, a distance between the second original mark and the center point is less than or equal to a distance between the fifth original mark and the center point, and a distance between the third original mark and the center point is less than or equal to a distance between the sixth original mark and the center point.

5. The method of claim 4, wherein the second mark group of the captured image comprises a fourth mark corresponding to the fourth original mark, a fifth mark corresponding to the fifth original mark, and a sixth mark corresponding to the sixth original mark, wherein calibrating the projection area according to the first mark group or the second mark group in the captured image during the first calibration operation further comprises:
   determining to calibrate the projection area using an angle variation between the fourth mark, the fifth mark, and the sixth mark of the second mark group and the fourth original mark, the fifth original mark, and the sixth original mark of the second original mark group in response to the absolute difference between the first included angle and the second included angle being less than or equal to the threshold.

6. The method of claim 5, wherein the calibration pattern further comprises a seventh original mark corresponding to a connection line between the first vertex and the second vertex, the captured image further comprises a seventh mark corresponding to the connection line between the first vertex and the second vertex, and the method further comprises:
   determining to calibrate the projection area using the first triangle and the second triangle in response to a first included angle formed by the seventh original mark, the fourth original mark, and the fifth original mark being less than a second included angle formed by the seventh mark, the fourth mark, and the fifth mark.

7. The method of claim 2, wherein the second original mark group of the calibration pattern comprises a fourth original mark corresponding to the first vertex, a fifth original mark corresponding to the second vertex, and a sixth original mark corresponding to the third vertex, and the second mark group of the captured image comprises a fourth mark corresponding to the fourth original mark, a fifth mark corresponding to the fifth original mark, and a sixth mark corresponding to the sixth original mark; and wherein calibrating the projection area according to the first mark group or the second mark group in the captured image during the first calibration operation comprises:
   determining to calibrate the projection area using the first mark, the second mark, and the third mark of the first mark group in response to at least one mark corresponding to the fourth mark, the fifth mark, and the sixth mark not being comprised in the captured image.

8. The method of claim 3, wherein calibrating the projection area using the angle variation between the first mark, the second mark, and the third mark of the first mark group and the first original mark, the second original mark, and the third original mark of the first original mark group comprises:
   calibrating the projection area by reducing the angle variation.

9. The method of claim 1, further comprising:
   performing the first calibration operation when the processor determines that the captured image comprises the closed area but the projection area does not comprise the complete closed area, comprising:
   calibrating the projection area using an angle variation between the first mark, the second mark, and the third mark of the first mark group and the first original mark, the second original mark, and the third original mark of the first original mark group.

10. The method of claim 2, wherein the second original mark group of the calibration pattern comprises a fourth original mark corresponding to the first vertex, a fifth original mark corresponding to the second vertex, and a sixth original mark corresponding to the third vertex, the second mark group of the captured image comprises a fourth mark corresponding to the fourth original mark, a fifth mark corresponding to the fifth original mark, and a sixth mark corresponding to the sixth original mark, and calibrating the projection area according to the second mark group in the captured image during the second calibration operation comprises:
   performing second image recognition on the captured image to identify a first corner of the closed area, wherein a distance between the first corner and a second center point of the projection area is less than a distance between the fourth mark and the second center point; and
   correcting the projection area such that the distance between the fourth mark and the second center point is less than the distance between the first corner and the second center point.

11. The method of claim 10, further comprising:
   performing the second image recognition on the captured image to identify a second corner and a third corner of the closed area, wherein a distance between the second corner and the second center point is less than a distance between the fifth mark and the second center point, and a distance between the third corner and the second center point is less than a distance between the sixth mark and the second center point;

obtaining a first included angle between a first straight line formed by the fourth mark and the fifth mark and a second straight line formed by the first corner and the second corner;

obtaining a second included angle between a third straight line formed by the fourth mark and the sixth mark and a fourth straight line formed by the first corner and the third corner; and calibrating the projection area such that the first included angle and the second included angle are close to zero.

12. The method of claim 1, wherein the calibration pattern is a rectangle, the first original mark group comprises four original marks, and the second original mark group comprises eight original marks.

13. A projection system, comprising:
a projector;
an image capturing device; and
a processor, coupled to the image capturing device and the projector, wherein the processor is configured to:
project a calibration pattern by the projector to form a projection area, wherein the calibration pattern comprises a first original mark group and a second original mark group, the second original mark group surrounds the first original mark group, and the first original mark group surrounds a center point of the calibration pattern;

obtain a captured image comprising the projection area by the image capturing device, wherein the captured image comprises a first mark group corresponding to the first original mark group of the calibration pattern and a second mark group corresponding to the second original mark group of the calibration pattern;

perform first image recognition on the captured image to determine whether the captured image comprises a closed area formed by a complete line, perform a first calibration operation when the captured image does not comprise the closed area, and perform a second calibration operation when the projection area in the captured image comprises the complete closed area;

calibrate the projection area according to the first mark group or the second mark group in the captured image during the first calibration operation; and calibrate the projection area according to the second mark group in the captured image during the second calibration operation.

* * * * *